United States Patent [19]

Shiga et al.

[11] Patent Number: 4,768,067
[45] Date of Patent: Aug. 30, 1988

[54] REPRODUCING CAMERA FOCUS CONTROL METHOD

[75] Inventors: Koji Shiga; Tatsunari Arito, both of Kanagawa, Japan

[73] Assignee: Fuji Photo Film Co., Ltd., Kanagawa, Japan

[21] Appl. No.: 573,758

[22] Filed: Jan. 25, 1984

[30] Foreign Application Priority Data

Jan. 25, 1983 [JP] Japan ................................. 58-10237

[51] Int. Cl.[4] ...................... G03B 27/34; G03B 27/40
[52] U.S. Cl. ........................................ 355/56; 355/77; 355/53
[58] Field of Search ............................ 355/56, 77, 53; 354/400

[56] References Cited

U.S. PATENT DOCUMENTS 3,704,657 12/1972 Sliwkowski et al. ................. 355/56
3,735,686 5/1973 Brewer et al. ......................... 355/56
3,832,058 8/1974 Gusovius ............................. 355/56
4,021,115 5/1977 Jeppesen ............................. 355/56

Primary Examiner—Monroe H. Hayes
Attorney, Agent, or Firm—Sughrue, Mion, Zinn, Macpeak and Seas

[57] ABSTRACT

A method for correcting the focus at plural image positions in a reproducing camera system in which plural images are to be formed on a photosensitive material, the supporting base for which can vary in flatness from position to position. Prior to exposure of the photosensitive material, values are stored in a memory for each image position indicative of the amount of deviation of that position from a reference flat position. For the exposure of each image position, the corresponding value is read out and applied to an automatic lens positioning system to thus correct the focus for each image position.

3 Claims, 3 Drawing Sheets

| IMAGE PHOTOGRAPHING POSITION | FLATNESS |
|---|---|
| 1 | 0 |
| 2 | −10 |
| 3 | −6 |
| ⋮ | |
| 10 | +10 |

REPRODUCING CAMERA FOCUS CONTROL METHOD

BACKGROUND OF THE INVENTION

The present invention relates to a reproducing camera control method. More particularly, the invention relates to a reproducing camera control method for compensating for variations in flatness of a photosensitive support base.

In a camera, such as a microfiche camera or the like, which is used to photograph a plurality of objects which are imaged at different positions on a sheet of film, the images are likely to get out of focus even if a slight "curvature" (variation in flatness) is present in a film platen supporting the sheet of film. It has been customary for overcoming this problem to manufacture the film platen—usually, a vacuum platen—so as to provide a higher degree of flatness. However, to do so is extremely expensive and significantly increases the manufacturing time of the platen. Moreover, it is difficult to maintain a highly flat state once the film platen is in actual use.

An object of the present invention, which was made in view of the aforementioned circumstances, is to provide a reproducing camera control method which is capable of readily accommodating deformation occurring in a film platen in use and for which there is no need of a film platen having a very high degree of flatness.

SUMMARY OF THE INVENTION

The aforementioned and other objects of the invention are accomplished by a reproducing camera control method for use in a reproducing camera in which a photosensitive material and a reproducing optical system are moved relative to one another to record a plurality of images on the photosensitive material, information indicative of the flatness of a photosensitive material supporting base is stored at a plurality of image photographing positions, and the flatness-indicating information is read out and applied to correct the focusing position of a lens for each image photographed, thereby effecting focusing control of the optical system.

DESCRIPTION OF THE PREFERRED EMBODIMENTS

A preferred embodiment of the invention will be fully described with reference to the accompanying drawings.

Figure 1A:
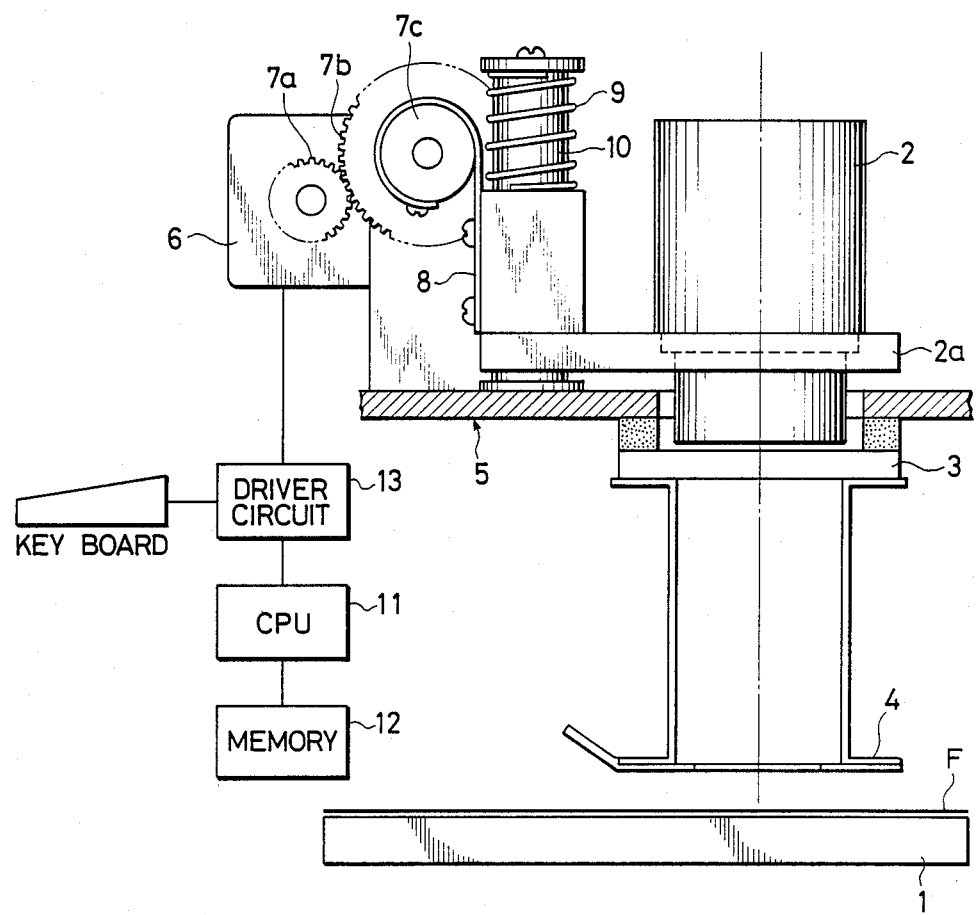
FIG. 1A is a diagram showing a major portion of a reproducing camera constructed in accordance with the present invention.
Figure 1B:
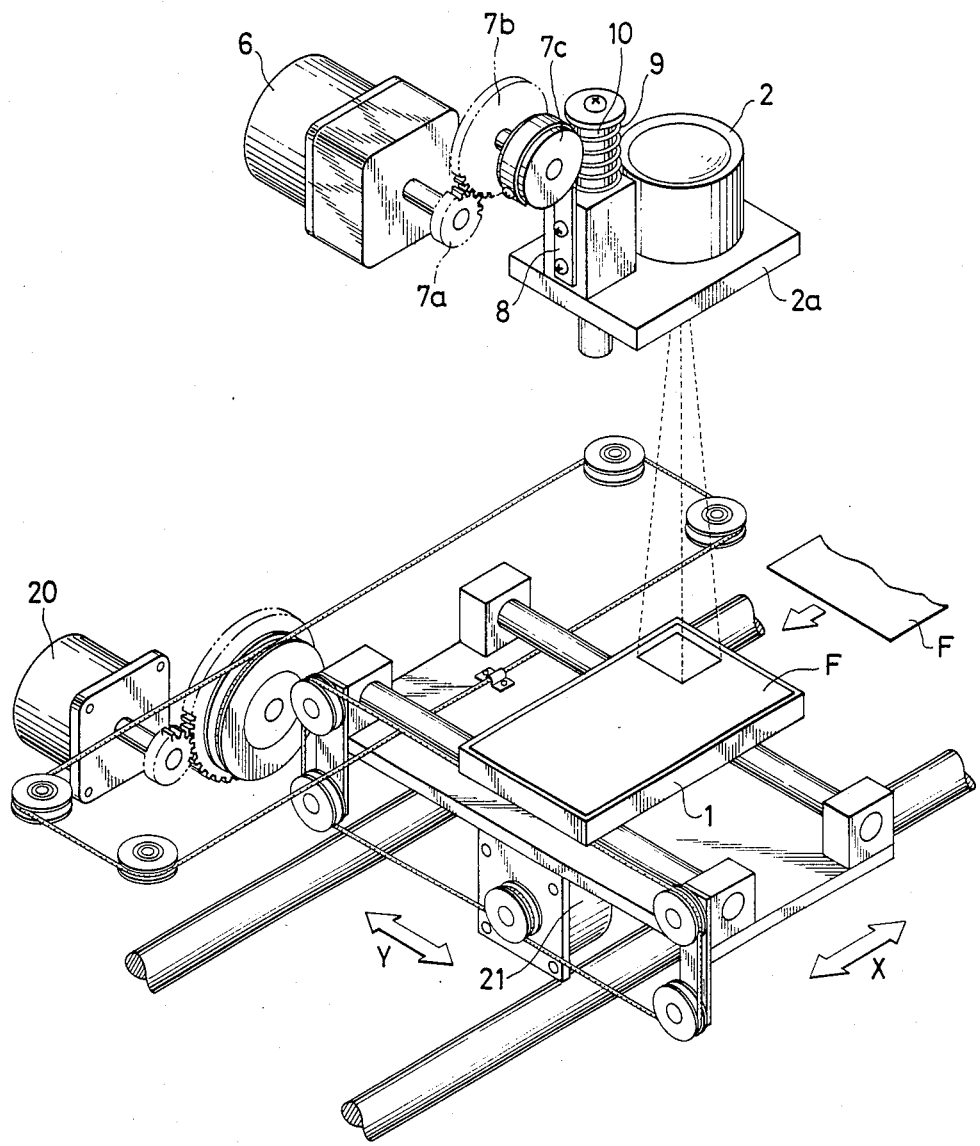
FIG. 1B is a perspective view showing a major portion of a reproducing camera constructed in accordance with the present invention.

FIG. 1A is a diagram depicting a major portion of a reproducing camera embodying the invention. FIG. 1B is a perspective view depicting a major portion of a reproducing camera embodying the invention. As shown therein, reference numeral 1 indicates a film platen for supporting a sheet of film F which is movable in X and Y directions in a horizontal plane by X-drive motor 20 and Y-drive motor 21, respectively. Reference numerals 2, 3 and 4 indicate an objective lens, a shutter, and a film gate assembly, respectively. The objective lens 2 is connected by a holder 2a to a focusing mechanism 5. The focusing mechanism 5 operates to position along a shaft 10 the lens holder 2a, which is slidably held on the shaft 10 by a metal belt 8, one end of which is wound around and fixed to a takeup wheel 7c. The takeup wheel 7c is coaxially secured to a gear 7b which engages with a pinion 7a mounted on a shaft of a pulse motor 6. A coil spring 9 is positioned around the shaft 10. The pulse motor 6 is controlled by a driver circuit 13 via a microcomputer 11 (hereinafter referred to as "CPU"). The CPU 11 is provided with a memory 12 in which information specifying the flatness of the film platen 1 is stored. The memory is composed of a random access memory backed up by a battery.

Figures 2, 3:
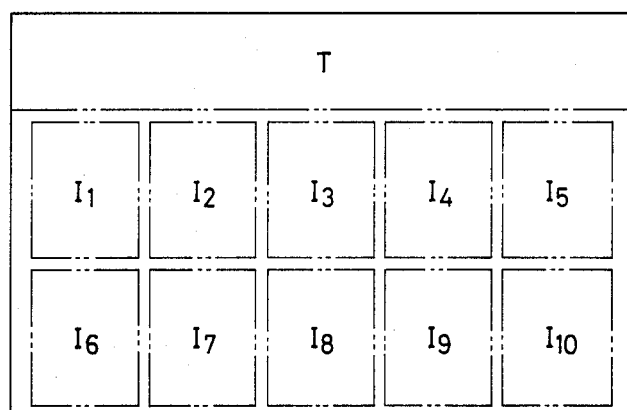
FIG. 2 is a view showing an example of the contents of a memory used in the arrangement of FIG. 1.
FIG. 3 is a view showing image photographing positions.

An example of such information is shown in FIG. 2. Numerical values of flatness specified in the right-hand column represent measurements obtained by dividing values representing sensed irregularities by a predetermined unit length. FIG. 3 shows image photographing positions on the film platen 1, wherein $I_1$ to $I_{10}$ denote image sections and T indicates a title portion.

The operation of the reproducing camera control system of the invention constituted as aforementioned will now be explained.

The objective lens 2 is positioned to be in true focus at a flat reference level of the film platen 1. When the object to be imaged is photographed in the first image photographing position $I_1$, the CPU 11 reads flatness 0 from a memory 12, indicating no focus correction control is needed. When the film holder plate 1 is moved to photograph an object on the second image photographing position $I_2$ upon completion of the first photographing operation, the CPU 11 reads a flatness value $-10$ corresponding to this position from the memory 12 and calculates the value of a control signal needed to move the pulse motor from its position for the previous image photographing position $I_1$ to a focusing position needed to correct for a flatness value of $-10$. This control signal is applied to a driver circuit to cause the pulse motor to rotate through an angle required to adjust the focusing position. Similarly, further focusing corrections can be carried out in the same manner for the third, fourth, etc. image photographing positions.

If desired, values which will directly instruct the pulse motor to move to the correct focusing position can be stored in the memory 12. Moreover, the data stored in the momery 12 can readily be rewritten to correct for any focusing problems noted in a developed image.

We claim:

1. A method for controlling the focusing position of an objective lens of a reproducing camera system in which images are to be recorded at a plurality of image positions in one plane on a photosensitive material supported by a supporting base which has a position which deviates from a reference position in accordance with said image position, comprising the steps of:

storing values, for a plurality of said image positions, each indicative of said deviation in the position of said supporting base at each of said image positions, said value being related to the distance between the position of said supporting base and said reference position;

for each image position being recorded, reading out the corresponding one of said values; and positioning said lens of said camera in accordance with the read-out value so as to provide correct focusing for each of said image positions.

2. The method of claim 1, further comprising; the steps of measuring said deviation, wherein said values are computed by dividing said measured deviation by a predetermined unit length.

3. The method of claim 1, further comprising; the steps of providing a control signal, having a magnitude corresponding directly to said computed value, to a motor coupled to said lens so as to move said lens to a correct focusing position.

* * * * *